(12) United States Patent
Laturell

(10) Patent No.: US 8,194,853 B2
(45) Date of Patent: Jun. 5, 2012

(54) SURGE IMMUNITY CIRCUIT FOR TELECOM DDA

(75) Inventor: Donald Laturell, Oak Hill, FL (US)

(73) Assignee: LSI Corporation, Milpitas, CA (US)

( * ) Notice: Subject to any disclaimer, the term of this patent is extended or adjusted under 35 U.S.C. 154(b) by 527 days.

(21) Appl. No.: 12/490,515

(22) Filed: Jun. 24, 2009

(65) Prior Publication Data

US 2010/0329445 A1    Dec. 30, 2010

(51) Int. Cl.
    *H04M 1/00* (2006.01)
(52) U.S. Cl. .................................. 379/412; 379/395.01
(58) Field of Classification Search ............. 379/395.01, 379/412
    See application file for complete search history.

(56) References Cited

U.S. PATENT DOCUMENTS 4,396,882 A * 8/1983 Kellenbenz ................... 323/278
4,517,414 A * 5/1985 Boeckmann ................... 379/393

* cited by examiner

*Primary Examiner* — Walter F Briney, III

(57) ABSTRACT

In described embodiments, a data communication device employing, for example, a modem and a data access arrangement (DAA) electrically connected to a telephone network has an increased surge immunity through use of improved hook switch driver and line modulation driver circuitry. In accordance with described embodiments, hook switch driver circuitry exhibits decreased surge power dissipation by maintaining the hook switch driver transistors in saturation at higher currents while reducing the collector-emitter voltage across hook switch driver transistors, and line modulation driver circuitry exhibits decreased total surge power dissipation by i) limiting surge voltage ii) over voltage stress of the line driver transistor.

13 Claims, 3 Drawing Sheets

US 8,194,853 B2

SURGE IMMUNITY CIRCUIT FOR TELECOM DDA

BACKGROUND OF THE INVENTION

1. Field of the Invention

The present invention relates to communications circuits, and, in particular, surge immunity for a telephone line interface.

2. Background of the Invention

Telephone lines to a residence in the United States, and in some other countries, might have common mode voltages of over 100V. In the U.S., the Federal Communications Commission (FCC) requires isolation of a telephone line from each electric-main powered device (such as a PC) connected to the telephone line through, for example, a modem. Isolation is desirable to prevent damage to devices within the telephone network (see, for example, 47 CFR 68.302,4 (Oct. 1, 1997 Edition, for such U.S. regulations)). A data access arrangement (DAA) is specified by the FCC to isolate the telephone lines from electric main powered devices, such as illustrated in FIG. 1. Modem 102 of Data Communications Controller (DCC) 101 is coupled to power main 105. DAA 104 coupled to modem 102 through barrier 103 that provides isolation of modem 102 (and hence, DCC 101) from telephone network 106. Although barrier 103 is shown using capacitors for isolation, prior art may employ other forms of isolation. Since a voice band modem signal is limited to operation with signal frequencies within the 100 Hz to 3600 Hz band, a DAA circuit implementation might be constructed using a transformer operating as a bandpass filter as a barrier to isolate the electric-main powered device from the telephone line.

Smaller-size, and potentially lower-cost, DAA circuits might use active circuits to communicate with the central telephone office. These lower-cost circuits are generally required to tolerate surges (sudden changes in voltage and/or current) from the outside line from the central telephone office (telco).

FIG. 2 shows a schematic of a prior art DAA circuit 200 comprising DAA core circuit 201, secondary protection circuit 202, hook switch driver circuit 203, and line modulation driver circuit 204. Hook switch driver circuit 203 includes transistor Q3 207 and transistor Q2 208, and corresponding bias resistor R1 205 and resistor R2 206. Line modulation driver circuit 204 comprises transistor Q4 211, transistor Q5 212, and resistor R4 214.

DAA core circuit 201 includes most of the DAA circuitry in, for example, an integrated circuit and a small number of discrete components. Connections TDC and RDC are electrically connected to nodes N7 and N8, respectively, and monitor the DC levels of TIP and RING signals coupling through secondary protection circuit 202. Connection HS1 at node N1 controls hook switch driver circuit 203 operation. Connection RX monitors the incoming telephone line signal on node N2 when hook switch driver 203 is turned on. Connection LM at node N4 controls line modulation driver 204 operation. Connection LMS at node N5 monitors the line current as a voltage across current sense resistor R4 214 of line modulator driver 204 on node N5.

Secondary Protection 202 DC couples the telephone TIP and RING signals to DAA circuit 200 nodes N3, N7, and N8. The signals at nodes N7 and N8 are protected copies of the TIP and RING signals, respectively. The signal at node N3 is a combination of the TIP and RING signals. Secondary protection circuit 202 employs protection circuits such as, for example, diode clamps, filters, fuses, and transient voltage suppressors. Generally, a secondary protection circuit provides additional protection to a modem circuit to prevent damage from lightning or other types of surges. Details of secondary protection circuit requirements may be found in safety document IEC61000-4-5.

Hook switch driver circuit 203 is a switching circuit that functionally connects or disconnects a device, such as, for example DCC 101 from the phone line. When DCC 101 is "on hook," or functionally disconnected from the phone line, current flowing into HS1 of DAA core circuit 201 is turned off causing transistor Q3 207 and transistor Q2 208 to turn off thereby causing $I_{LINE}$ to decrease to zero and break contact with the local loop. When DCC 101 is "off hook", current flowing through HS1 of DAA core circuit 201 is turned on causing transistor Q3 207 and transistor Q2 208 to turn on thereby causing $I_{LINE}$ to increase to its normal operating level (current flows through the loop) and contact with the local loop is restored. N2 is the node employed to feed the receive signal or inbound signal back to DAA core circuit 201 with connection to the RX input.

Line modulation driver circuit 204 is the last active stage of DAA circuit 200 transmitter (generator of outbound signal current). Current from connection LM at node N4 of DAA core circuit 201 controls the compound transistor pair comprising transistor Q5 212 and transistor Q4 213. The line current is sensed as a voltage across resistor R4 214 at node N5 and is fed back to DAA core circuit 201 on connection LMS.

Hook switch driver circuit 203 and line modulator driver circuit 204 are susceptible to damage from surges on the telephone line due to their connection to node N3. Surges may produce excessive currents in transistor Q3 207 and transistor Q2 208 that may cause them to come out of saturation thereby experiencing damage due to excessive power dissipation. Surges may also produce excessive voltage at node N2 that may, for example, result in voltage overstress or excessive power dissipation in transistor Q5 212 and transistor Q4 211.

One technique for surge protection with a smaller-size DAA circuit employs a circuit known as an FOH (fast off-hook) circuit. The FOH protects active circuitry from potentially damaging surges by interrupting telco loop current, and corresponding data flow, for hundreds of msecs.

Another technique for surge protection employs logic control elements to selectively enable one or more surge immunity circuits at the desired moment in time. If enable timing is not correct, damage might still result from a surge from mistimed control signals. If dedicated control signals are not available to enable the surge immunity circuits, shared or general purpose controls with potentially limited bandwidth might also be employed.

Techniques such as these are often incorporated early in the design phase of a DDA. Adding them late in the design process might be costly, if possible at all.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for increased phone line surge immunity by a) increasing current gain in a transistor switch without a reduction in overhead voltage, b) reducing current modulator peak power dissipation that occurs during surge events, both of which without reducing performance. A surge protection circuit includes a hook switch driver circuit and a line modulation driver circuit. The hook switch driver circuit is configured to switch between an on-hook state and an off-hook state. The line modulation driver circuit is coupled to the hook switch driver circuit and configured to provide an output signal when in an off-hook state, wherein the hook switch driver circuit is configured to maintain transistors of the hook switch driver circuit in saturation in the presence of a surge current, and the line modulation driver circuit is configured to limit i) a surge voltage and ii) an over-voltage stress of a line driver transistor of the line modulation driver circuit.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with exemplary embodiments of the present invention, a data communication device employing, for example, a modem and a data access arrangement (DAA) electrically connected to a telephone network has an increased surge immunity through use of improved hook switch driver and line modulation driver circuitry. In accordance with described embodiments, hook switch driver circuitry exhibits decreased power dissipation by maintaining the hook switch driver transistors in saturation at higher currents while reducing the collector-emitter voltage across hook switch driver transistors, and line modulation driver circuitry exhibits decreased total surge power dissipation by i) limiting surge voltage ii) over voltage stress of the line driver transistor. The present invention is particularly useful for modem telephone modems employing integrated circuit(s) having limited drive and employing devices having limit surge power dissipation characteristics.

Embodiments of the present invention provide for improvement of surge immunity of a DAA circuit with a small number of low-cost components to existing printed circuit board (PCB) designs. The embodiments provide for a) an increase of off-hook driver circuit gain with reduced dissipated power during a surge event and b) improved dissipation of surge power in a protective clamp circuit. The embodiments provide for these advantages without interrupting data flow and without degrading circuit performance.

Figure 3:
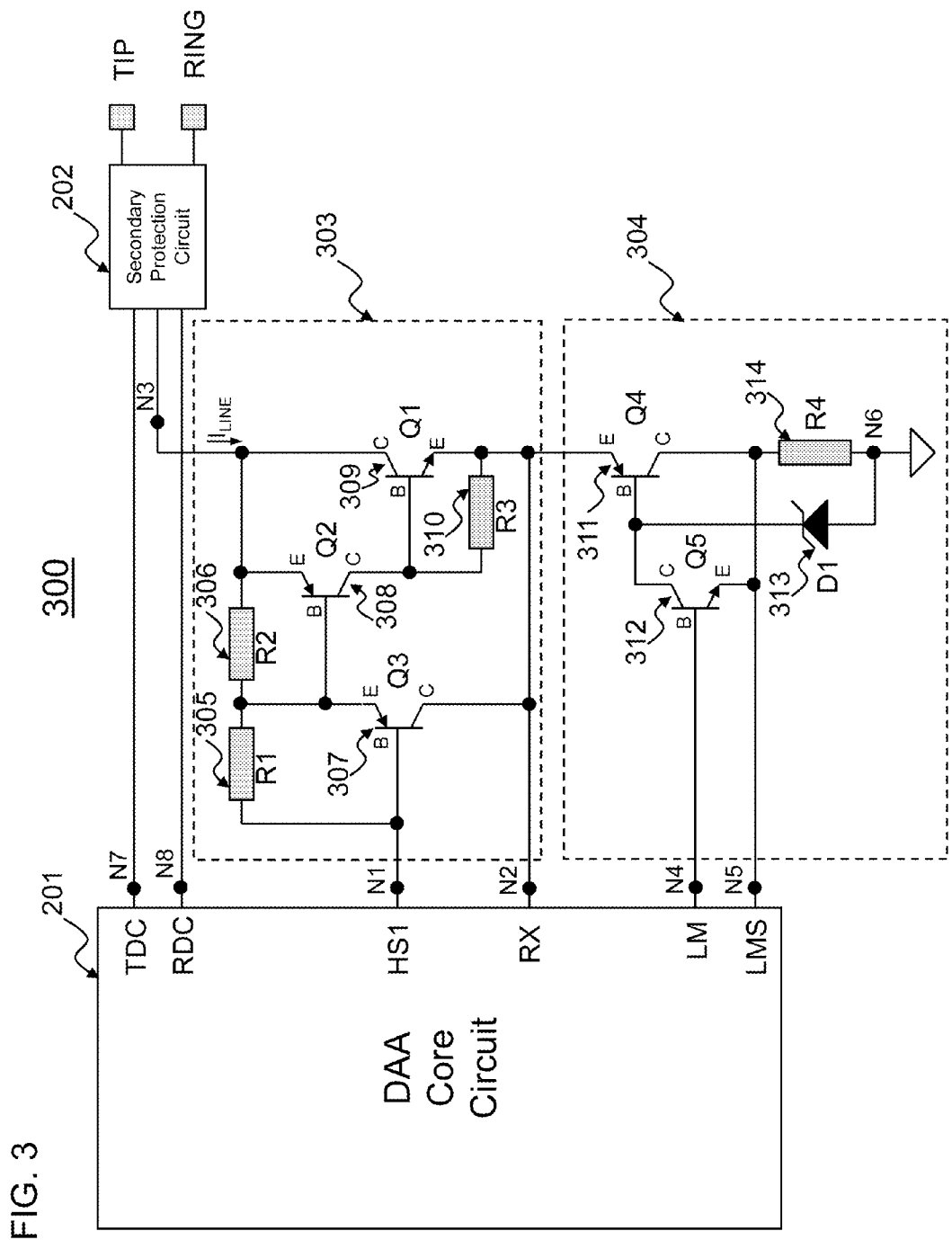
FIG. 3 shows a schematic of a data access arrangement (DAA) in accordance with an exemplary embodiment of the present invention.

FIG. 3 shows a schematic of DAA circuit 300 in accordance with an exemplary embodiment of the present invention. Circuit 300 includes DAA core circuit 201, secondary protection circuit 202, hook switch driver circuit 303, and line modulation driver circuit 304 (made up of transistor 311, transistor 312, resistor 314, and clamp diode 313). Hook switch driver circuit 303 comprises transistor Q3 307, transistor Q2 308, and transistor Q1 309, with corresponding bias resistor R1 305, resistor R2 306, and resistor R3 310. Line modulation driver circuit 304 comprises transistor Q4 311, transistor Q5 312, resistor R4 314, and clamp 313, shown implemented in the figures as a diode.

Figure 1:
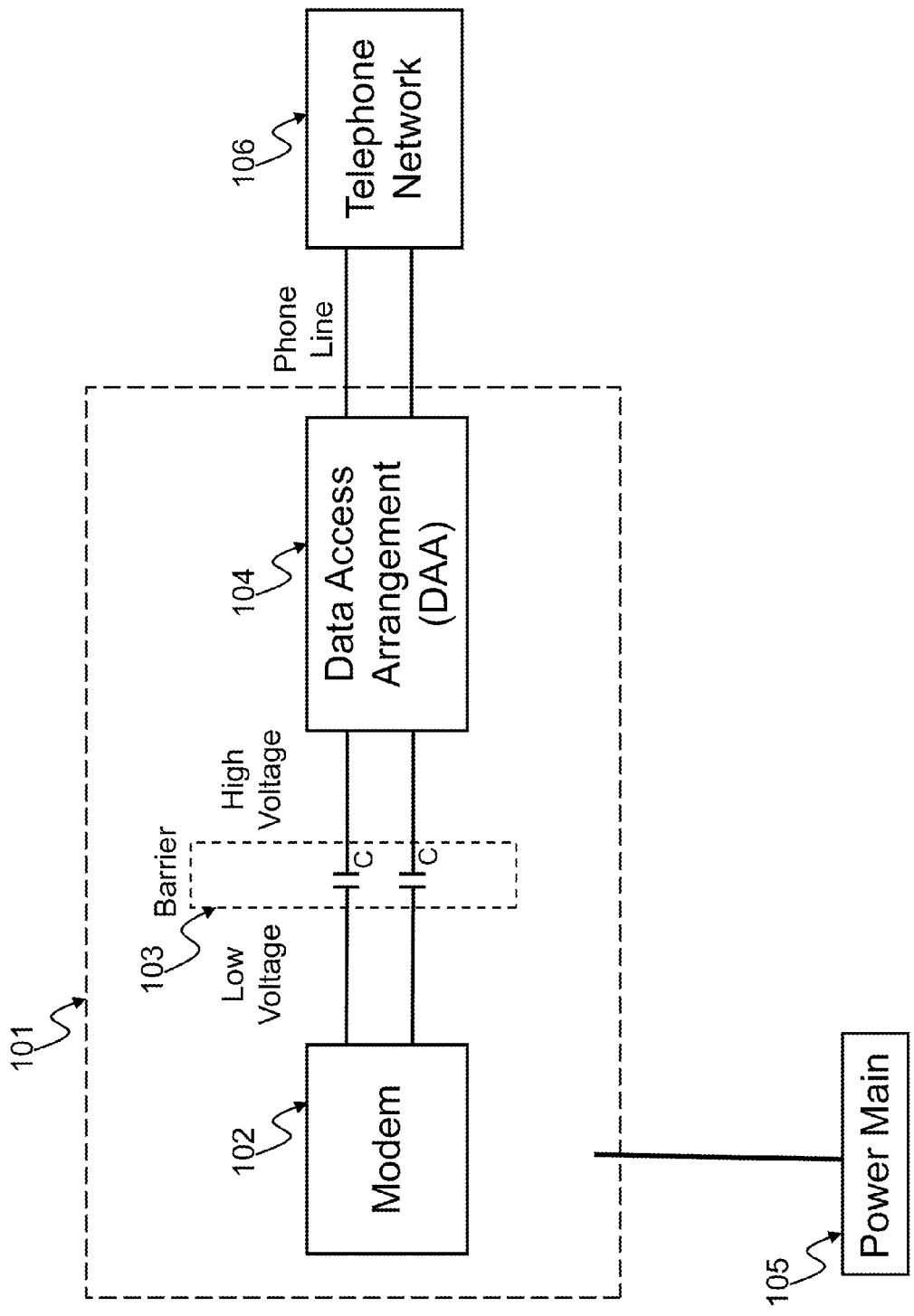
FIG. 1 shows a block diagram of a conventional interface between a telephone network and an electrical main powered device in accordance with prior art.
Figure 2:
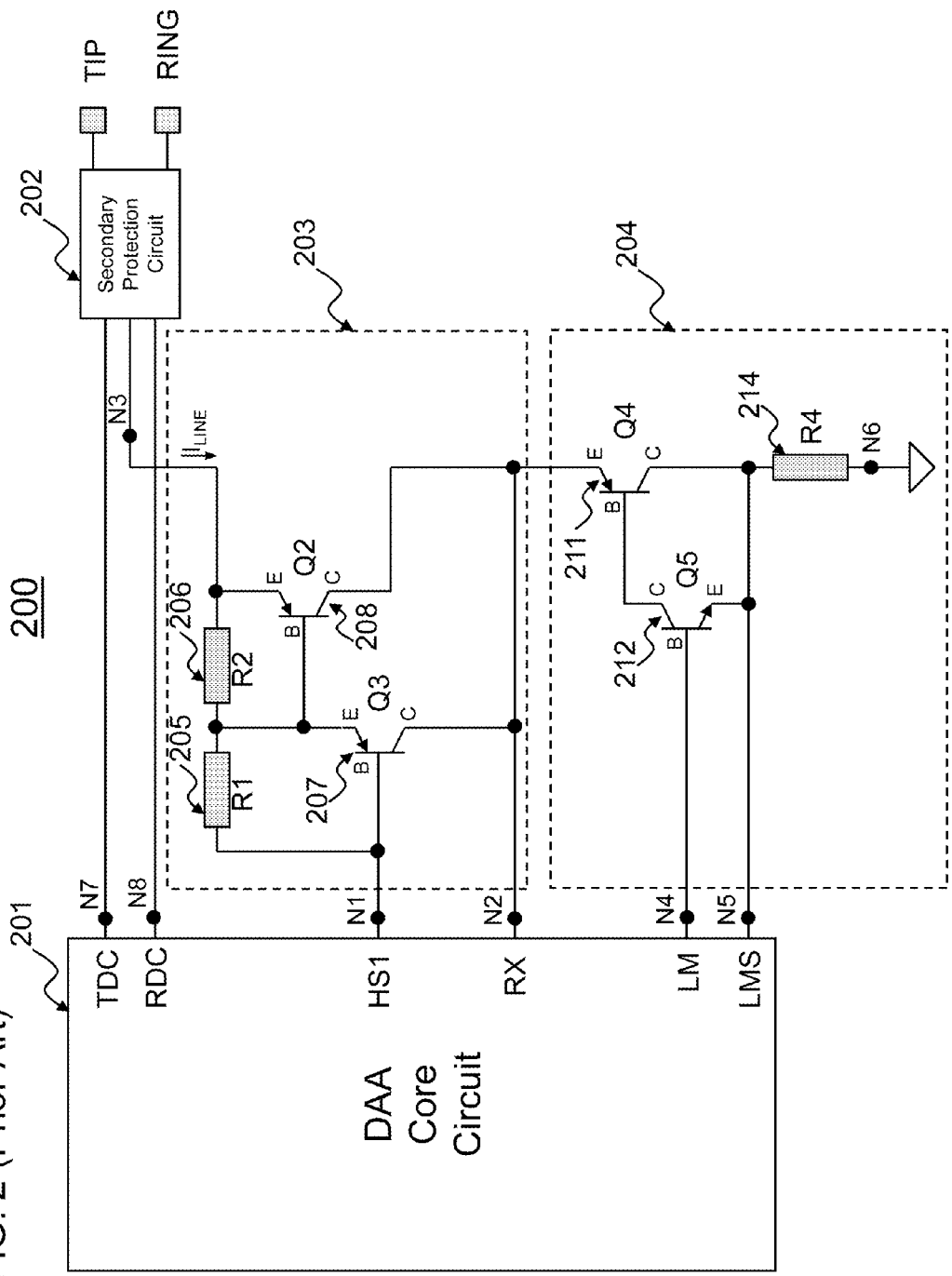
FIG. 2 shows a schematic diagram of a data access arrangement (DAA) in accordance with prior art.

DAA core circuit 201 and secondary protection circuit 202 of FIG. 3 operate analogously to the DAA core circuit and secondary protection circuit described above and shown in FIG. 2. DAA core circuit 201 (comprising of, for example, an integrated circuit and a small number of discrete components) is coupled to secondary protection circuit 202 (comprising of, for example, diode clamps, filters, fuses, and transient voltage suppressors) through connections TDC and RDC at nodes N7 and N8 to monitor the TIP and RING signals, respectively. The HS1 signal from DDA core circuit 201 couples to hook switch driver circuit 303 at node N1 to source control current to functionally connect and disconnect DAA circuit 300 with the phone line. When DAA circuit 300 is functionally connected to the phone line, the receive or inbound signal is present at node N2 and coupled to input RX of DAA core circuit 201 to monitor the line signal. The LM signal from DAA core circuit 201 couples to line modulation circuit 304 at node N4 to the source control signal to line modulation driver circuit 304. Line current is sensed as a voltage across current sense resistor R4 314 at node N5 which is coupled to LMS input of DAA core circuit 201.

Hook switch circuits such as, for example, hook switching driver circuit 303 functionally connect ("off hook") or disconnect ("on hook") a device coupled to a phone line. Transistors Q3 307 and Q2 308 comprise a first transistor gain stage and transistor Q1 309 comprises a second transistor gain stage function as a high gain switch controlled by the HS1 connection of DAA core circuit 201 and switching the line current, $I_{LINE}$, on and off. The HS1 (switch hook control signal) connection of DAA core circuit 201 couples to the base of transistor Q3 307 at switch hook control node N1. The emitter of transistor Q3 307 is coupled to the base of transistor Q2 308. The collector of transistor Q2 308 is coupled to the base of transistor Q1 309. This coupling path from HS1 to transistor Q1 309 produces a current gain that is approximately the product of the individual current gains or P of transistors Q3 307, Q2 308, and Q1 309. The collector of transistor Q3 307 and the emitter of transistor Q1 309 are coupled to node N2. The emitter of transistor Q2 308 and collector of transistor Q 1309 are coupled to node N3. Resistors R1 305, R2 306 and R3 310 are coupled across the bases and emitters of transistors Q1 307, Q2, 308 and Q1 309, respectively, to keep the transistors turned off when HS1 is not sourcing current (the "on hook" state). Node N2 is functionally connected to node N3 when HS1 is sourcing current (the "off hook" state) providing a coupling path from node N3 to line modulation driver circuit 304. N2 is also the node employed to feed the receive signal or inbound signal back to DAA core circuit 201 with connection to the RX input.

Increased surge immunity might be achieved by means of increased gain in the hook switch driver circuit. Hook switch driver circuit 303 might achieve greater current gain than prior art hook switch driver circuits (such as hook switch driver circuit 203 of FIG. 2) by employing the second transistor gain state described earlier comprising transistor Q1 309 with bias resistor R3 310, coupled across transistor Q2 308 emitter and collector. If the minimum gain or β of each transistor in hook switch driver circuit 303 and hook switch driver circuit 203 has a value, for example, of 20, the hook switch driver minimum gains would be approximately 8000 for circuit 303 and approximately 400 for the prior art hook switch driver circuit 203 of FIG. 2. Further, if DAA core circuit 201 has a minimum hook switch output current of 2 mA, hook switch driver circuit 303 might remain in saturation with output currents up to 16 A, while prior art hook switch driver circuit 203 might only remain in saturation with output currents up to 800 mA. Other device limitations such as, for example, a transistor's safe operating area, might limit output currents to, for example, 4A. Therefore, hook switch driver circuit 303, having possibly a greater saturated output current than prior art hook switch driver circuit 203, might achieve the greater surge immunity characteristics.

The addition of a transistor gain stage comprising transistor Q1 309 to the hook switch driver circuit 303 desirably does not add an additional diode drop to the circuit and maintains the bias condition of output node N3, because transistor Q1 309 is an NPN transistor that is not in the series current path of transistor 307 and transistor 308 (both shown in FIG. 3 as PNP transistors) to the hook switch output. Thus, homologation requirements of the DC load line, as might be set by telephone standards, remain unaffected.

Line modulation driver circuit 304 comprises clamp 313 coupled between the base of transistor Q4 311 and bottom of resistor R4 314, with the collector of transistor Q4 311 and top of resistor R4 314 coupled in series.

Line modulation driver circuit 304 modulates the line current, $I_{LINE}$, to transmit data when hook switch drivers 303 is in the "off hook" state. The LM connection to DAA core circuit 201 at node N4 couples to the base of transistor Q5 312 as the control input to line modulation driver circuit 304. The collector of transistor Q5 312 is coupled to the base of transistor Q4 311 and one side of clamp 313. The other side of clamp 313 is coupled to the reference node N6. Current sense resistor R4 314 is coupled between node N5 (including the emitter of transistor Q5 312 and the collector of transistor Q4 311) and reference node N6. Node N5 also couples to connection LMS of DAA core circuit 201 to provide feedback for line modulation control. The output of line modulation driver 304, the emitter of transistor Q4 311, is coupled to hook switch driver circuit 303 at node N2.

Line modulation driver circuit 304 might achieve greater surge immunity characteristics than a prior art line modulation driver circuit (such as line modulation driver circuit 204 of FIG. 2) by employing clamp 313 to limit potential surge voltage at the base of transistor Q4 311 and to increase current sink characteristics of transistor Q4 311 during a surge event. DAA core circuit 201 sources the control signal to the base of transistor 312 and monitors voltage across line current sensing resistor R4 314. In prior art line modulation driver circuit 204, if DAA core circuit 201 has limited or otherwise insufficient current to maintain proper biasing of transistor Q4 211 during a surge event, the sink current of transistor Q4 211 might be limited, for example, to 300 mA; and the emitter voltage of transistor Q4 211 and the collector voltage of transistor Q5 212 might, for example, reach 250V resulting in a power dissipation of 75 watts. Such power dissipation of 75 watts typically causes circuit damage. If i) the clamp voltage of clamp 313 of FIG. 3 is selected as, for example, 17V so as not to turn on during normal operation and ii) a surge event occurred with the same 300 mA of surge current, line modulation driver circuit 304 might dissipate 5.1 watts. The reduced power dissipated in line modulation driver circuit 304 increases the time that circuit 304 might be subject to surge conditions without damage.

Both the hook switch driver and the line modulation driver are susceptible to damage from surges on the phone line since they are both in the output path of the DAA. Increasing the surge tolerance of the hook switch driver might not increase the surge tolerance of the line modulation driver. Similarly, increasing the surge tolerance of the line modulation driver might not increase the surge tolerance of the hook switch driver. Hook switch driver circuit 303 decreases power dissipation in the hook switch driver by increasing the circuit gain and keeping the hook switch driver in saturation at higher currents thus reducing the collector-emitter voltage across transistor Q2 308 and across transistor Q1 309. Line modulation driver circuit 304 decreases the total surge power dissipation by i) limiting the surge voltage with clamp 313 and ii) limiting over voltage stress on transistor Q5 312. Consequently, preferred embodiments of the present invention employ both hook switch driver circuit 303 and line modulation driver circuit 304 operating together.

A circuit employing one or more embodiments of the present invention might allow for the following advantages. Some embodiments eliminate costly and time-consuming redesign of a line side modem integrated circuit that would otherwise be required to improve surge immunity. Some embodiments might withstand surges induced by a grounded loop simulator and meet the IEC61000-4-5 surge immunity specification. The increased surge immunity might be achieved without reduced performance such as, for example, reduced overhead voltage or extended data flow interruption following a surge event. Additionally, the surge immunity functions are automatically activated when surge events occur and deactivate when not required. Thus, an embodiment of the present invention might increase DAA surge immunity at a low cost and without reducing performance.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this description, it is understood that all gates are powered from a fixed-voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding nodes or ports may be referred to by the same name and are interchangeable for purposes here.

Transistors are typically shown as single devices for illustrative purposes. However, it is understood by those with skill in the art that transistors will have various sizes (e.g., gate width and length) and characteristics (e.g., threshold voltage, gain, etc.) and may consist of multiple transistors coupled in parallel to get desired electrical characteristics from the combination. Further, the illustrated transistors may be composite transistors.

As used in this specification and claims, the term "output node" refers generically to either the source or drain of a metal-oxide semiconductor (MOS) transistor device (also referred to as a MOSFET), and the term "control node" refers generically to the gate of the MOSFET. Similarly, as used in the claims, the terms "source," "drain," and "gate" should be understood to refer either to the source, drain, and gate of a MOSFET or to the emitter, collector, and base of a bi-polar device when the present invention is implemented using bi-polar transistor technology.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A surge protection circuit comprising:
a hook switch driver circuit i) coupled to a core circuit and adapted to receive a hook switch control signal at a first node and to monitor a line signal at a second node, and ii) coupled to an output node, said hook driver switch having a first transistor gain stage coupled to the output node, the first node, and the second node and a second transistor gain stage coupled to the first transistor gain stage and across the second node and the output node, said second transistor gain stage generally increasing the gain of the hook switch driver circuit; and
a line modulation driver circuit coupled to the hook switch driver circuit, said line modulation driver circuit having a third gain stage comprising i) a first transistor and a second transistor, ii) a current sense resistor having a first terminal and a second terminal, and iii) a clamp, wherein:
the first transistor provides gain to a base of the second transistor, the second transistor coupled between the second node and the first terminal of the current sense resistor, the second terminal of the current sense resistor coupled to a reference node, and the clamp coupled across the base of the second transistor and the second terminal of the current sense resistor, and
wherein, when said hook switch is enabled by the off-hook signal, i) said line modulation driver circuit is coupled through the hook switch driver circuit to the output node, ii) said second transistor gain stage providing a sink for a surge current through the hook switch driver circuit, and iii) said clamp limits surge voltage at the base of the second transistor.

2. The invention of claim 1, wherein the second transistor gain stage maintains an output node bias of the output node.

3. The invention of claim 1, wherein the clamp is a diode.

4. The invention of claim 1, further comprising a secondary protection circuit coupled to a tip and a ring of a telephone network, the secondary protection circuit including a tip monitor and ring monitor output provided to the core circuit, and the output node.

5. The invention of claim 4, wherein the core circuit is a data access arrangement (DAA) circuit.

6. The invention of claim 1, wherein the second transistor gain stage comprises a third transistor and a biasing resistor coupled between a base of the third transistor and the first node, the base of the third transistor further coupled to a collector of the first transistor gain stage.

7. The invention of claim 1, wherein the surge protection circuit is implemented in an integrated circuit (IC) chip).

8. A surge protection circuit comprising:
a hook switch driver circuit configured to switch between an on-hook state and an off-hook state; and
a line modulation driver circuit coupled to the hook switch driver circuit and configured to provide an output signal when in an off-hook state,
wherein the hook switch driver circuit is configured to maintain transistors of the hook switch driver circuit in saturation in the presence of a surge current, and the line modulation driver circuit is configured to limit i) a surge voltage and ii) an over-voltage stress of a line driver transistor of the line modulation driver circuit.

9. The invention of claim 8, wherein the surge protection circuit is implemented in an integrated circuit (IC) chip).

10. The invention of claim 8, comprising a clamp and a current sense transistor, a first terminal of the current sense resistor coupled to a reference voltage, wherein the clamp is coupled across a base of the line driver transistor and a second terminal of the current sense resistor.

11. The invention of claim 10, wherein the clamp is a diode.

12. The invention of claim 8, wherein the surge protection circuit is coupled between i) a tip and a ring of a telephone network and ii) a data access arrangement (DAA) circuit, the hook switch driver circuit configured to switch between the on-hook state and the off-hook state of the DAA.

13. A method of surge protection comprising:
switching, by a hook switch driver circuit, between an on-hook state and an off-hook state;

maintaining transistors of the hook switch driver circuit in saturation in the presence of a surge current;

providing, by a line modulation driver circuit coupled to the hook switch driver circuit, an output signal when in an off-hook state; and limiting, by the line modulation driver circuit, i) a surge voltage and ii) an over-voltage stress of a line driver transistor of the line modulation driver circuit.

* * * * *